(12) United States Patent
Smith et al.

(10) Patent No.: US 11,840,665 B2
(45) Date of Patent: Dec. 12, 2023

(54) AQUEOUS RETARDED ACID TREATMENT COMPOSITION FOR WELL STIMULATION

(71) Applicant: SAUDI ARABIAN OIL COMPANY, Dhahran (SA)

(72) Inventors: Kern Larry Smith, Dhahran (SA); Abdullah Almoajil, Dhahran (SA); Mohammed H. Al-Khaldi, Dhahran (SA); Ali Alsalem, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/396,157

(22) Filed: Aug. 6, 2021

(65) Prior Publication Data
US 2023/0043923 A1 Feb. 9, 2023

(51) Int. Cl.
*E21B 43/27* (2006.01)
*C09K 8/74* (2006.01)
*C09K 8/60* (2006.01)

(52) U.S. Cl.
CPC ............... *C09K 8/74* (2013.01); *C09K 8/602* (2013.01); *E21B 43/27* (2020.05); *C09K 2208/12* (2013.01); *C09K 2208/20* (2013.01); *C09K 2208/28* (2013.01); *C09K 2208/32* (2013.01)

(58) Field of Classification Search
CPC ...... C09K 8/74; C09K 8/602; C09K 2208/20; C09K 2208/12; C09K 2208/32; E21B 43/27
See application file for complete search history.

(56) References Cited

U.S. PATENT DOCUMENTS

| | | | |
|---|---|---|---|
| 3,319,714 A | 5/1967 | Knox | |
| 3,917,536 A | 11/1975 | Crowe | |
| 3,962,101 A | 6/1976 | Crowe | |
| 4,322,306 A | 3/1982 | Dill | |
| 7,455,112 B2 | 11/2008 | Moorehead et al. | |
| 9,920,606 B2 | 3/2018 | Jiang et al. | |
| 10,703,957 B2 | 7/2020 | Al-Yami et al. | |
| 11,230,661 B2 * | 1/2022 | Kalgaonkar | C09K 8/80 |
| 2009/0042750 A1 * | 2/2009 | Pauls | C09K 8/76 |
| | | | 507/213 |
| 2014/0246198 A1 * | 9/2014 | Pandya | C09K 8/54 |
| | | | 166/305.1 |
| 2014/0296113 A1 * | 10/2014 | Reyes | C09K 8/74 |
| | | | 510/109 |
| 2016/0075935 A1 * | 3/2016 | Usener | C08F 220/52 |
| | | | 166/279 |
| 2016/0298024 A1 * | 10/2016 | Panga | C09K 8/74 |

(Continued)

FOREIGN PATENT DOCUMENTS

| | | |
|---|---|---|
| CN | 110317593 A | 10/2019 |
| WO | 2015088513 A1 | 6/2015 |
| WO | 2015154977 A1 | 10/2015 |

(Continued)

*Primary Examiner* — Silvana C Runyan
(74) *Attorney, Agent, or Firm* — Osha Bergman Watanabe & Burton LLP

(57) ABSTRACT

An acid treatment composition includes a nonionic surfactant, including nonyl phenol ethoxylate. The acid treatment composition also includes a retarding agent comprising magnesium, an acid, and water. The nonionic surfactant and retarding agent of the acid treatment composition are reactive with carbonate.

18 Claims, 3 Drawing Sheets

(56) References Cited

U.S. PATENT DOCUMENTS

2018/0244981 A1\* 8/2018 Panga ................. E21B 37/06
2018/0244982 A1\* 8/2018 Yakovlev ............. C09K 8/72

FOREIGN PATENT DOCUMENTS

| WO | 2016164327 A1 | 10/2016 |
| WO | 2017040553 A1 | 3/2017 |
| WO | 2018144558 A1 | 8/2018 |
| WO | 2018183241 A1 | 10/2018 |

\* cited by examiner

AQUEOUS RETARDED ACID TREATMENT COMPOSITION FOR WELL STIMULATION

BACKGROUND

Acid treatments, such as matrix acidizing, are often performed in well stimulation of subterranean formations. Acid treatments can increase hydrocarbon productivity by creating flow channels in low-permeability formations, as well as increase permeability in existing channels. For example, a well may initially exhibit low permeability, whereby acid stimulation may be employed to commence production from the reservoir. In other stimulation examples, acid treatments can be used to further encourage permeability and flow from an already existing well that has become under-productive.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an acid treatment composition. The acid treatment composition may include a nonionic surfactant, including nonyl phenol ethoxylate. The acid treatment composition may also include a retarding agent comprising magnesium, an acid, and water. The nonionic surfactant and retarding agent of the acid treatment composition may be reactive with carbonate.

In another aspect, embodiments disclosed herein relate to an acid treatment composition including a nonionic surfactant, wherein the nonionic surfactant is 0.5% to 2.0% by weight composition of the acid treatment composition, a retarding agent, wherein the retarding agent is 10% to 30% by weight composition of the acid treatment composition, and an acid, wherein the acid is 0.5% to 20% by weight composition of the acid treatment composition. The remaining composition of the acid treatment composition may include an inert solvent.

In another aspect, embodiments disclosed herein relate to a method of reducing the reactivity of an acid treatment composition. The method may include introducing the acid treatment composition into a wellbore such that the acid treatment composition contacts a formation, wherein the acid treatment composition includes a nonionic surfactant, wherein the nonionic surfactant is 0.5% to 2.0% by weight composition of the acid treatment composition and comprises nonyl phenol ethoxylate. The acid treatment composition may also include a retarding agent, wherein the retarding agent is 10% to 30% by weight composition of the acid treatment composition and comprises magnesium; and an acid, wherein the acid is 0.5% to 20% by weight composition of the acid treatment composition. The remaining composition of the acid treatment composition may include water. The method may also include allowing the acid treatment composition to contact with the formation for between 0.5 and 12 hours.

Other aspects and advantages of the claimed subject matter will be apparent from the following description and the appended claims.

DETAILED DESCRIPTION

In one aspect, embodiments disclosed herein relate to compositions and methods for retarding the reaction rate between an acid treatment composition and a carbonate formation that, when used in accordance with embodiments of the present disclosure, may facilitate greater depth of penetration in the carbonate formation. Specifically, one or more embodiments of the present disclosure relate to compositions and methods for reducing the reaction rate between an acid, such as HCl, and a carbonate formation material matrix through the addition of a nonionic surfactant and retarding agent, such as a salt, to the acid.

Acid treatment compositions according to embodiments of the present disclosure may be used for well stimulation. Well stimulation methods using acid to stimulate production of a well may be referred to as acidizing. In such methods, an acid treatment composition, or components thereof, may be pumped down a well to react with and dissolve parts of the well formation, which may enlarge fluid pathways (e.g., rock pores) through the formation. In successful treatments, the dissolution process may result in the formation of highly conductive channel networks and increased permeability through the formation, thereby enhancing hydrocarbon production. When acid treatment compositions are injected into the well at pressures below the fracture pressure of the formation (i.e., the pressure required to fracture the formation), the method may be referred to as matrix acidizing. When acid treatment compositions are injected into the well at pressures at or above the fracture pressure of the formation, the method may be referred to as fracture acidizing or acid fracturing. Fracture acidizing may include a hydraulic fracturing treatment for carbonate formations in which acid-etched channels serve as high-conductivity flow-paths for hydrocarbon production along the face of the fracture. Acid treatment compositions described herein may be used for acidizing, acid washing, filter cake removal, matrix acidizing, and acid fracturing, for example.

Figure 1A:
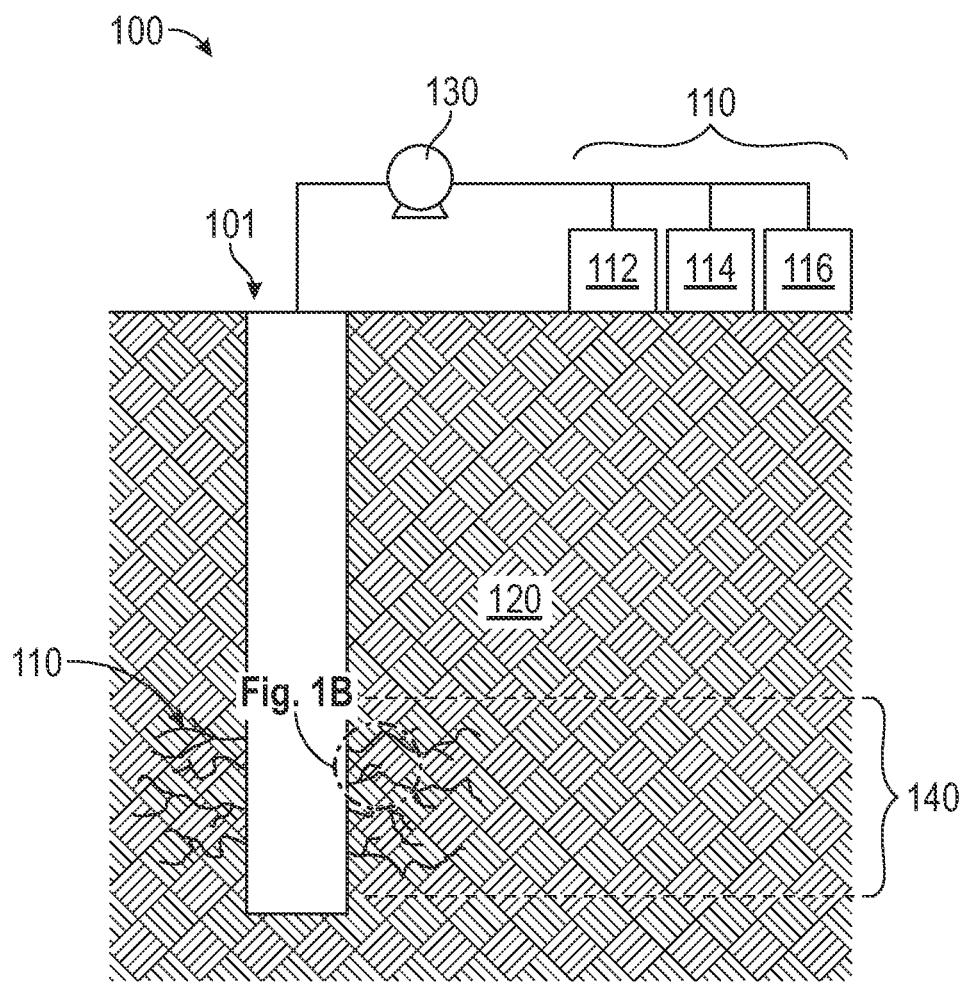
FIG. 1A shows a schematic of a subterranean formation during an acidizing treatment.

FIG. 1A shows an example of a well system 100, in which an acid treatment composition 110 according to embodiments of the present disclosure may be used to acidize the well formation 120. The acid treatment composition 110 may be formed of an acid 112, a nonionic surfactant 114, and a retarding agent 116. The acid treatment composition components (acid 112, nonionic surfactant 114, and retarding agent 116) may be mixed together at the surface of the well 101, for example, by continuously mixing (on the fly) the ingredients together as they are pumped downhole or by batch mixing the ingredients together and then pumping the batch of mixed ingredients downhole. The acid treatment composition 110 may be pumped down the well 101 using one or more pumps 130 at a selected rate and pressure to flow through a fractured portion 140 of the well 101. The fractured portion 140 of the well 101 may include a plurality of fractures extending from the wellbore into the formation 120, where the fractures may be formed from acid fracturing (pumping the acid treatment composition 110 into the well 101 at pressures at or above the fracturing pressure) or where the fractures may be formed prior to pumping the acid composition 110 into the well 101.

Figure 1B:
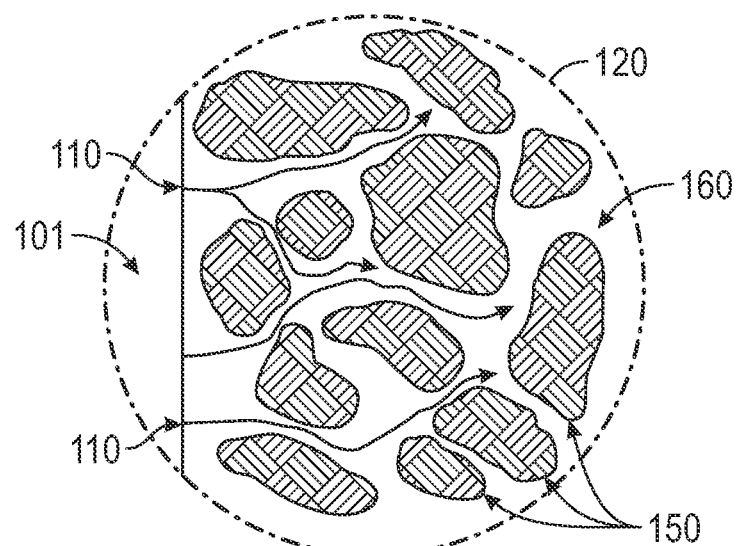
FIG. 1B shows a pore-scale acidizing treatment within a near-well subterranean formation.

FIG. 1B shows a pore-scale schematic of the acid treatment composition 110 contacting the rock matrix 150 of the well formation 120. As shown in FIG. 1B, the acid treatment composition 110 is shown (using arrows) to penetrate and flow through pore spaces 160 of the rock matrix 150. The acid treatment composition 110 passes through the pore spaces 160 and the acid in the acid treatment composition 110 reacts with the composition of the rock matrix 150. The reaction between the acid and the rock matrix 150 may dissolve at least portions of the rock matrix 150, thereby creating new channels or enlarging existing channels, or both. After completion of the acidizing process, hydrocarbons (not shown) may flow through the channels (enlarged or newly created pore spaces 160) towards the well 101. Although FIGS. 1A-1B show a vertical well 101, it will be understood by those skilled in the art that horizontal or other directional wells may also use the acidizing processes disclosed herein.

Acids used in well stimulation techniques, such as matrix acidizing, may be selected based on their reactivity with the rock matrix of the carbonate formations. For example, acid stimulation may be carried out in formations including calcite, dolomite, and the like, using strong acids. In some embodiments, acids used in acid treatment compositions may include strong mineral acids, including hydrochloric acid (HCl), which may be chosen because of its low cost and effectiveness in dissolving calcium and magnesium carbonates.

The rate of reaction between the acid in the acid treatment composition and the carbonate formation may impact the depth of acid penetration in the formation, as well as the overall success of an acidizing operation. The rate at which acid treatment compositions react with reactive materials in a carbonate formation is a function of various factors, including the acidizing fluid composition, acid concentration in the fluid, temperature of the fluid and/or formation, and the pH of the system. While conventional acid treatments can be very effective in some formations, such as sandstones, where significant acid penetration is possible, the depth of penetration in carbonate formations is limited because the acid is consumed rapidly before significant penetration is possible. Also, the amount of material available for dissolution is much greater in carbonate rock. By using acid treatment compositions according to embodiments of the present disclosure, the reaction between the acid component in the acid treatment composition and carbonate rock may be attenuated, or retarded, and the reduced reaction rate may allow deeper penetration of the acid treatment. Deeper formation penetration of an acid treatment composition may generate long flow channels etched into fracture surfaces, whereby hydrocarbons may flow and productivity of a well may be increased.

One or more embodiments of the present disclosure relate to compositions and methods for reducing the reaction rate between an acid, such as HCl, and a carbonate formation material matrix through the addition of at least a nonionic surfactant compound and a retarding agent. Specifically, one or more embodiments relate to acid treatment compositions for downhole applications, wherein the acid treatment composition may create a synergistic retarding effect via a nonionic organic surfactant and an inorganic retarding agent.

Treatment Fluid Compositions

According to embodiments of the present disclosure, an acid treatment composition may include an acid, a nonionic surfactant, a retarding agent, and water or other inert solvent. In some embodiments, acid treatment compositions may include additional optional additives to provide other compatibility or performance characteristics suitable for a selected application and formation. Ingredients of acid treatment compositions according to embodiments of the present disclosure are discussed in more detail below.

According to embodiments of the present disclosure, a nonionic surfactant may be a nonionic retarding surfactant. The structure of the nonionic surfactant molecule may contribute to the solubility and stability of the aqueous acid mixture in high salinity base fluids. Additionally, the structure of the nonionic surfactant may contribute to the adsorption characteristics of the acidization solution, thereby resulting in reaction retardation.

Nonionic surfactants may have a chemical structure including a lipophilic/hydrophobic portion formed of $C_9H_{19}$, and a hydrophilic portion formed of $O-(CH_2CH_2O)_nH$, where n has an average of 6. An example of a nonionic surfactant according to embodiments of the present disclosure is nonylphenol ethoxylate (NPE). In some embodiments, nonionic surfactants may be selected from NPEs having a cloud point lower than the application use temperature. Additionally, nonionic surfactants may be selected from organic surfactants that are not considered viscoelastic surfactants.

Embodiments of the present disclosure may include a nonionic retarding surfactant that possess amphiphilic characteristics. In such embodiments, the nonionic surfactant may include a hydrophilic head-group and a hydrophobic tail-group. The hydrophilic group bearing the head moiety may be selected to adsorb onto a carbonate formation surface while the hydrophobic group bearing the tail moiety may repel the acid-containing aqueous fluid, thereby providing a temporary barrier on the carbonate surface.

Additionally, acid treatment compositions according to embodiments of the present disclosure may also include a retarding agent. Suitable retarding agents for use in acid treatment compositions disclosed herein may be selected from salts having: i) a cation selected from the group consisting of lithium, sodium, potassium, rubidium, cesium, beryllium, magnesium, calcium, strontium, barium, titanium, zirconium, molybdenum, tungsten, manganese, iron, cobalt, rhodium, iridium, nickel, palladium, platinum, copper, zinc, cadmium, boron, aluminum, gallium, indium, thallium, tin, ammonium, and combinations thereof; and ii) an anion selected from the group consisting of fluoride, chloride, bromide, iodide, sulfate, bisulfate, sulfite, bisulfite nitrate, acetate, formate, and combinations thereof. Examples of retarding agents in accordance with the present disclosure include inorganic salts, such as magnesium chloride hexahydrate salt and magnesium chloride ($MgCl_2$). According to embodiments of the present disclosure, the retarding agent may be added to the acid treatment composition in an amount up to its solubility limit in the acid treatment composition.

It is proposed that the inorganic retarding agent added to acid treatment compositions of embodiments disclosed herein may provide a salinity in the acid treatment composition that lowers the cloud point of the nonionic surfactant, thereby reducing the solubility of the nonionic surfactant in the acid treatment composition, which may force adsorption of the nonionic surfactant onto the carbonate rock surface.

When introduced into a wellbore, the nonionic surfactants may adhere to the rock surface via surface adsorption resulting from the coordination of the hydrophilic head-groups with the rock surface, while the tail-groups may be directed outward. The tail-groups may induce a hydrophobic character in the vicinity of the rock surface, which may effectively form a hydrophobic layer around the rock surface. This hydrophobic character may hinder access by the acid in the acid treatment composition to the rock surface. Therefore, rather than reacting with the hydrophobic characterized rock, the acid in the acid treatment composition may pass deeper into the formation, where it may encounter and react with a portion of formation surface material not hindered by the nonionic surfactant.

Thus, in acid treatment composition systems according to embodiments of the present disclosure, different interaction mechanisms in the system work together to improve acid retardation, including using the retarding agent to increase salinity in the acid treatment composition and reduce solubility of the nonionic surfactant in the system, which may help the nonionic surfactant form an acid barrier around the rock. Further, when using a relatively high concentration of a salt retarding agent when compared with other down hole fluid systems having salt, the synergy between the retarding agent and the nonionic surfactant may provide an increased amount of acid retardation. Additionally, nonionic surfactants in acid treatment compositions of embodiments of the present disclosure may have improved compatibility with other acidizing additives, as compared to anionic, cationic, and zwitterionic surfactants.

In embodiments of the present disclosure, the concentration of the nonionic surfactant in the acid treatment composition may range from 0.1 to 10% by weight (wt. %) of the mixture (e.g., 0.5 to 2% by weight concentration of the nonionic surfactant). The retarding agent concentration of acid treatment compositions according to embodiments of the present disclosure may range from about 10 to 30 wt. % of the acid treatment composition. These ranges may provide greater than expected results of retarding the rate of reaction between the acid in the acid treatment composition and carbonate formations, particularly when the nonionic surfactant and retarding agent are used in combination in accordance with embodiments of the present disclosure.

In some embodiments, the concentration of the retarding agent in the acid treatment composition may be greater than 20 wt. % of the mixture (e.g., 25 wt. % or greater). For example, in embodiments using $MgCl_2$ as the retarding agent in the acid treatment composition, it is believed that when an acid treatment composition includes a high $MgCl_2$ salinity (e.g., a $MgCl_2$ concentration of greater than 20 wt. % of the acid treatment composition), a $Mg^{2+}/Ca^{2+}$ monolayer may form around carbonate rock being treated, which may result in the secondary dolomitization of the calcite surface, thereby adding to the retardation effect. Such acid treatment compositions providing simultaneous calcite dissolution and dolomite/Mg-calcite precipitation may be used in downhole environments with temperatures ranging from 40 to 200° C., for example, to provide greater acid penetration in carbonate formations.

Acid treatment compositions according to embodiments of the present disclosure may also include an inorganic acid, an organic acid, or an acid-producing system as a means of tailoring the acid reactivity with the formation, or rock matrix. For example, suitable inorganic acids may include, but are not limited to, hydrochloric acid (HCl), nitric acid, phosphoric acid, sulfuric acid, hydrofluoric acid, hydrobromic acid, perchloric acid, fluoroboric acid, or derivatives, and mixtures thereof. Suitable organic acids may include, but are not limited to, formic acid, acetic acid, citric acid, lactic acid, sulfamic acid, chloroacetic acid, or derivatives, and mixtures thereof. Suitable acid-producing systems may include, but are not limited to, esters, lactones, anhydrides, orthoesters, polyesters or polyorthoesters. In some embodiments, acid-producing systems may include esters of short chain carboxylic acids, including, but not limited to, acetic and formic acid, and esters of hydroxycarboxylic acids, including, but not limited to, glycolic and lactic acid. These acid-producing systems may provide the corresponding acids when hydrolyzed in the presence of water. Acids suitable for use in acid treatment compositions disclosed herein may also include sulfonic-based acids and glutamic-based acids.

In some embodiments, the acid treatment composition of the present disclosure may incorporate an acid in an aqueous solution. The acid may be present in an aqueous solution at a concentration in a range of from about 0.5 wt. % to about 20 wt. % of the acid treatment composition.

Acids used in acid treatment compositions of the present disclosure may be selected from strong acids, such as hydrochloric acid (HCl). For example, hydrochloric acid (HCl) may be used as an acid for stimulation purposes. The fast reaction times and consumption rates of HCl have conventionally made it a less favorable option for the stimulation of wells, particularly wells with long or multiple stages of fractures. However, by using HCl in acid treatment compositions of the present disclosure with a nonionic surfactant and a retarding agent, the reaction rate between HCl and a carbonate formation may be retarded, thereby allowing HCl to be more successfully used in acid stimulations.

Acid treatment compositions may be provided as a low viscosity acid treatment composition, a foam acid treatment composition, or as an emulsified acid treatment composition.

Low viscosity acid treatment compositions according to embodiments of the present disclosure may include an acid, a nonionic surfactant, a retarding agent, and water or other inert solvent. In some embodiments, the entire acid treatment composition may be formed of four components, including the acid, the nonionic surfactant, the retarding agent, and an inert solvent such as water. For example, water may be mixed with an acid, a nonionic surfactant, a retarding agent, or a combination thereof, to create an aqueous solution in accordance with embodiments of the present disclosure. In some embodiments, an acid treatment composition may include additives in addition to the acid, the nonionic surfactant, the retarding agent, and the inert solvent.

Low viscosity acid treatment compositions, once formed, may be a fluid having a viscosity low enough to fluidly flow through pore space in the formation being treated. For example, low viscosity acid treatment compositions may have a viscosity of greater than 0 and less than 10 centipoise (cP) at downhole conditions between 80° F. to 300° F. The low viscosity fluid may provide lower frictional losses as the fluid flows through pore space. This may be particularly desirable in the stimulation of tight carbonate formations.

Foam acid treatment compositions according to embodiments of the present disclosure may include an acid, a nonionic surfactant, a retarding agent, an inert solvent, and a foamer. Examples of foamers include, but are not limited to, surfactants, for example, water-soluble, nonionic, anionic, cationic, and amphoteric surfactants; carbohydrates, for example, polysaccharides, cellulosic derivatives, guar, guar derivatives, xanthan, carrageenan, starch polymers, gums, polyacrylamides, polyacrylates, betaine-based surfactants, viscoelastic surfactants, natural and synthetic clays; polymeric surfactants, for example, partially hydrolyzed polyvinyl acetate; partially hydrolyzed modified polyvinyl acetate; block or copolymers of polyethane, polypropane, polybutane and polypentane; proteins; partially hydrolyzed polyvinyl acetate, polyacrylate, and derivatives of polyacrylates; polyvinyl pyrrolidone and derivatives thereof; $N_2$; CO; $CO_2$; air; and natural gas; and combinations thereof. Additional examples of foamers may be found in U.S. Patent Application No. 2015/0080271, the contents of which are hereby incorporated by reference. Foamers may be added in addition to the nonionic surfactant and retarding agent in foam acid treatment compositions according to embodiments of the present disclosure, where the ingredients for the foam acid treatment compositions may be mixed at the surface and then pumped downhole into a well as a foam.

In some embodiments, the nonionic surfactants in acid treatment compositions may generate foam, thereby forming a foam acid treatment composition. The foamed form may be responsible for attenuation behavior of foam acid treatment compositions.

A foam acid treatment composition according to embodiments of the present disclosure may include an aqueous acid solution (where an acid may be provided in solution with a solvent), a foaming surfactant, and sufficient gas, such as nitrogen or carbon dioxide, to form a foam. It may also include a foam stabilizer, such as gelling agent. The acid in the aqueous acid solution may include, but is not limited to, hydrochloric acid, hydrofluoric acid, acetic acid, formic acid, glycolic acid, and mixtures of acids, thereof. For example, embodiments of the present disclosure may include an aqueous hydrochloric acid solution having a hydrochloric acid concentration in the range of from about 5 wt % to about 35 wt % of the aqueous acid solution. The aqueous acid solution may also include one or more corrosion inhibitors and corrosion inhibitor intensifiers, iron control agents and non-emulsifiers.

Emulsified acid treatment compositions according to embodiments of the present disclosure may include an acid, a nonionic surfactant, a retarding agent, an inert solvent, and an emulsifier.

According to embodiments of the present disclosure, an emulsified acid treatment composition may include an aqueous acid solution, a hydrocarbon, and an emulsifier. The acid solution of the emulsified acid treatment composition may include, but is not limited to, hydrochloric acid, hydrofluoric acid, acetic acid, formic acid, glycolic acid, and mixtures of the acids, thereof and a solvent. The acid concentration in the aqueous acid solution of the emulsified acid treatment composition may be from about 5 wt % to about 35 wt % of the aqueous acid solution. For example, an embodiment of the present disclosure may include an emulsified acid treatment composition, including an aqueous hydrochloric acid solution having a hydrochloric acid concentration in the range of from about 5 wt % to about 35 wt % of the aqueous acid solution. The aqueous acid solution may also include at least one of a corrosion inhibitor, a corrosion inhibitor intensifier, and an iron control agent. The hydrocarbon phase of the fluid composition may include diesel, kerosene, light crude oil, terpenes, or aromatics solvents, such as xylene, with amount corresponding from about 7% to about 45% volume based on the volume of acid solution, according to some embodiments of the present disclosure. The emulsifier may be dissolved in the oil in an amount ranging from about 1% to about 10% based on the total emulsified acid volume, to create an oil-external emulsion.

Compositions described in the present disclosure may optionally comprise one or more additives, for example, to improve the compatibility of the fluids described in this application with other fluids (for instance, formation fluids) that may be present in the wellbore. Suitable additives may be used in liquid or powder form. Additives may be present in the fluids in an amount sufficient to prevent incompatibility with formation fluids or wellbore fluids. For example, acid treatment compositions disclosed herein may include at least one of the following additives: corrosion inhibitors (e.g., present in an amount ranging from 0.1 to 5% by volume of the acid treatment composition), corrosion inhibitor intensifiers (e.g., present in an amount ranging from 0.1 to 5% by volume of the acid treatment composition), non-emulsifier surfactants (e.g., present in an amount ranging from 0.1 to 1% by volume of the acid treatment composition), iron control agents (e.g., present in an amount ranging from 0.3 to 1.2% by weight of the acid treatment composition), mutual solvents (e.g., present in an amount ranging from 1 to 10% by volume of the acid treatment composition), and $H_2S$ scavengers (e.g., present in an amount ranging from 0.5 to 2.0% by volume of the acid treatment composition).

In some embodiments, acid treatment compositions may optionally include one or more viscosifying agents. In some embodiments, an acid treatment composition may be viscosified by a polymer system, for instance, a cross-linked polymer system, where the crosslinker comprises zirconium or ferric metal clusters. In some embodiments, acid treatment compositions may include acid viscosifiers including polyacrylamide-based polymers, viscoelastic surfactants, and crosslinked systems utilizing Zr, Al or Fe crosslinkers, which may independently impart some acid retardation (as a separate retardation mechanism from the retardation mechanisms provided by the nonionic surfactant and retarding agent discussed above).

In some embodiments, it may be beneficial to add an additive to a viscosified fluid of an acid treatment composition as described in the present disclosure as the viscosified fluid is being pumped down hole to help eliminate the possibility of foaming. For example, in some embodiments, a viscoelastic surfactant may be optionally added to an acid treatment composition if the viscoelastic surfactant does not alter the surface properties of the nonionic surfactant in the acid treatment composition.

In some embodiments, an acid treatment composition may include mutual solvents. Mutual solvents may help keep other additives in solution. Suitable mutual solvents may include, but are not limited to, Halliburton's MUSOL® Mutual Solvent, MUSOL® A Mutual Solvent, MUSOL® E Mutual Solvent, ethyleneglycolmonobutylether, propyleneglycolmonobutylether, water, methanol, isopropyl alcohol, alcohol ethers, aromatic solvents, other hydrocarbons, mineral oils, paraffins, derivatives thereof, and combinations thereof. Other suitable solvents may also be used.

Additionally, synthetic polymers and copolymers may be used in acid treatment compositions according to embodiments of the present disclosure. Examples of such synthetic polymers include, but are not limited to, polyacrylate, polymethacrylate, polyacrylamide, polyvinyl alcohol, and polyvinylpyrrolidone.

In one or more embodiments, acid treatment compositions may optionally include additional additives. Examples of such additional additives may include, but are not limited to, pH-adjusting agents, pH-buffers, oxidizing agents, enzymes, lost circulation materials, scale inhibitors, clay stabilizers, corrosion inhibitors, paraffin inhibitors, asphaltene inhibitors, penetrating agents, clay control additives, iron control additives, reducers, oxygen scavengers, sulfide scavengers, emulsifiers, foamers, gases, derivatives thereof, and combinations thereof.

In some embodiments, acid treatment compositions may include a gelling agent, which may independently impart some acid retardation (as a separate retardation mechanism from the retardation mechanisms provided by the nonionic surfactant and retarding agent discussed herein) by reducing the mass transfer at the acid/substrate surface. However, acid treatment compositions according to embodiments of the present disclosure may not require the presence of gelling agents due to the mechanisms present in the acid treatment composition imparted by the nonionic surfactant and retarding agent in the acid treatment composition.

Synergistic Retarding Effect

Acid treatment compositions according to embodiments of the present disclosure may employ a dual adsorption mechanism with a carbonate rock that includes 1) the hydrophobic units of the nonionic surfactant may create a temporary diffusion barrier for the acid and 2) the surface dolomitization of the carbonate surface may inhibit the calcite dissolution rate. The dolomitization mechanism may occur as a result of the simultaneous coupled reactive transport associated with calcite dissolution and dolomite precipitation. Further, the dual adsorption mechanism may be associated with a reduction in free water through the use of the inorganic retarding agent (e.g., between 15 and 25 wt. % of $MgCl_2$ in the acid treatment composition). Rather than merely diverting acid to alternate zones in a wellbore, acid treatment compositions and methods of the present disclosure may provide a deeper penetration of the acid into the formation matrix in the treated zone when compared with conventional systems and methods.

Acid treatment compositions of the present disclosure may be used to treat and prepare carbonate formations for the production of hydrocarbons. Embodiments of the present disclosure may provide synergistic compounds in an acid treatment composition that may effectively slow down the acid (such as HCl) reaction rate (or intensity) with a carbonate surface without compromising acid strength or acid capacity. Specifically, in embodiments of the present disclosure, a temporary diffusion layer may be generated on the carbonate surface by both the hydrophobic units of the nonionic surfactant and surface crystallization, such as dolomitization, resulting in a retardation effect due to the lack of access to the rock matrix by the acid.

For example, in an acid treatment composition in accordance with embodiments of the present disclosure, magnesium chloride hexahydrate ($MgCl_2(H_2O)_6$) may be used at the retarding agent, HCl may be used as the acid, and nonylphenol ethoxylate may be used as the nonionic surfactant to treat a calcite formation. In this case, the hydrophobic units of the nonylphenol ethoxylate may generate a temporary diffusion barrier for the HCl combined with the surface dolomitization on the carbonate surface by magnesium adsorption. The temporary diffusion barrier formed on the carbonate surface using the nonionic surfactant and the retarding agent may inhibit the calcite dissolution rate. By inhibiting the calcite dissolution rate, the reaction rate between the acid in the acid treatment composition and the calcite may be attenuated due to the limited access to the calcite reaction sites.

The dual adsorption mechanism provided by acid treatment compositions of the present disclosure alleviates the need of gelling additives, including gelling surfactants, in the retardation of acid treatment composition rate of reaction with a carbonate formation. Thus, according to embodiments of the present disclosure, acid treatment compositions may be made without gelling additives.

Further, inorganic retarding agents used in acid treatment compositions of the present disclosure may also reduce the amount of free water in the acidization of a carbonate formation. The dual adsorption and reduced free water associated with the inorganic retarding agent may generate a synergistic retarding effect. Such synergistic retarding effect has been shown to provide improved performance of acid treatment compositions according to embodiments of the present disclosure when compared with conventional emulsified acids, as discussed in more detail below. For example, acid treatment compositions may have a relative reaction rate of acid treatment compositions according to embodiments of the present disclosure versus conventional emulsified acids of 3.8 times. In other words, when comparing equal volumes of each fluid, it took 3.8 times longer to dissolve 60% of the same mass of calcite. Additionally, coreflood testing of each fluid showed that a smaller breakthrough pore volume total ($PVT_{BT}$) was required for acid treatment compositions according to embodiments of the present disclosure versus conventional emulsified acids.

Treatment Application

Embodiments of the present disclosure may include introducing an acid treatment composition including an acid, a nonionic surfactant, and a retarding agent in an aqueous solution into a wellbore having a carbonate formation, such that the acid treatment composition contacts the carbonate formation. The nonionic surfactant may be selected to have hydrophobic components, which may form a temporary diffusion layer around a carbonate rock surface, thereby inhibiting the acid in the acid treatment composition from reacting with the rock surface. In other words, the hydrophobic portion of the nonionic surfactant may form a temporary diffusion layer that provides an unfavorable condition for the acid to contact the rock surface. The nonionic surfactant may imperfectly or non-uniformly cover the surface of the rock, and thus, the formed temporary diffusion layer may merely inhibit the fluid/solid interaction and modestly limit the surface reaction. Addition of viscosifiers (e.g., polymers or viscoelastic surfactants) may optionally be used to further enhance the acid retardation. Additionally, the retarding agent may be selected to be a salt capable of crystallizing the carbonate rock surface by salt ion adsorption (for example, dolomitization with magnesium ions and calcite mineral in the rock matrix). Crystallization of the rock surface may inhibit the rock mineral dissolution rate. These methods may attenuate or retard the reaction rate between acid and the carbonate formation.

In some embodiments, the step of contacting an acid treatment composition with a carbonate formation may comprise introducing the acid treatment composition into the formation via coiled tubing or bullheading in a production tube. Acid treatment compositions may be mixed prior to sending downhole, for example, mixed at the surface onsite or offsite, or batch mixed. For example, in some embodiments, methods may include the step of combining an aqueous solution of the nonionic surfactant, an aqueous solution of the retarding agent, and an aqueous solution of acid to create an acid treatment composition prior to introducing the acid treatment composition into the wellbore. Aqueous solutions of one or more components of the acid treatment composition may include the component(s) in a water solution.

In some embodiments, the step of contacting may include introducing an aqueous solution of the acid and an aqueous solution of the nonionic surfactant and the retarding agent into the formation via the same tubing (for example, the same coiled tubing) and allowing the aqueous acid treatment composition to form in situ within the tubing.

The reaction rate between an acid treatment composition and a formation may vary depending on the type of formation (e.g., mineralogy) and downhole temperature in which the reaction takes place. For example, the dissolution rate of carbonates may be faster than dolomites. Further, the reaction rate may be faster in higher temperatures. For example, in some embodiments, the acid treatment composition may be in contact with the formation for between 0.5 to 12 hours, depending on the conditions of the well.

In some embodiments, the methods may further optionally include introducing a clean-up solution to remove the surfactant, retarding agent, or acid, or a combination of all.

Additionally, methods according to embodiments of the present disclosure may further include producing hydrocarbons from the carbonate formation after introduction of an acid treatment composition into the formation, which may contain highly conductive channel networks formed by the retarded action of the acid in the acid treatment composition within the formation.

Experimental Results

The following descriptions of experiments using embodiments of the present disclosure are merely illustrative and should not be interpreted as limiting the scope of the present disclosure.

Reaction time of acid treatment compositions with carbonate rock samples was measured in lab experiments. Reaction time, as used here, is defined as the time required for an acid system to dissolve a determined percentage of a known initial quantity of a carbonate rock sample.

Static reaction rate experiments were conducted by temporarily submerging a disc of a rock composition having greater than 98 percent by volume calcite in an acid composition. The experiment lab-tested six different acid compositions, including acid treatment compositions in accordance with embodiments of the present disclosure. The initial weight of the rock discs was between 10-15 grams (g) and had the approximate diameter of 1.5 inches (in.) and approximate thickness of 0.25 in. The discs were each placed in separate containers holding acid compositions with an approximate volume of 50-75 milliliters such that the solid-to-acid volume ratio was 1:5 for each container in all experiments. The experimental solid-to-acid volume ratio was selected based on the known dissolution capacity of HCl on calcium carbonate minerals to be at least 60% spent. After a specified time (e.g., elapsed times of 2, 4, 6, 8, 10, 15, 20, 30, 45, and 60 minutes), the disc was removed from the acid composition and neutralized to halt the reaction (e.g., by soaking the disc in deionized water for a few minutes, blotting the disc dry, and then soaking in an acetone solution for about a minute). The disc was then dried (e.g., blow dried with compressed air for a few minutes until dry) and weighed to determine the percentage of disc material dissolved. The disc was then re-submerged in the acid composition for the specified time, wherein the process of removal, neutralizing, drying, weighing, and determining the percentage of dissolved disc material was repeated until the disc reached a pre-selected percent dissolution in the acid treatment composition.

The temperature of the acid treatment composition was maintained at 135° F. and the pressure was maintained at atmospheric pressure. According to embodiments of the present disclosure, acid treatment compositions may be used in downhole conditions having temperatures of about 80° F. or greater, where the greater the temperature, the faster the reaction rate between the acid treatment composition and formation.

Table 1 shows a comparison of the Relative Reaction Time for a carbonate disc to reach 60% dissolution (i.e., where 60 percent by weight of the disc is dissolved). Relative reaction time, as used herein, is defined by the reaction time of an acid treatment composition relative to a control acid composition. The control acid composition for this experiment was an acid composition solution having 85 wt % solvent and 15 wt % HCl (referred to as an HCl neat solution). Each acid composition tested included 15% wt % of HCl. A comparative acid composition was a solution of 15 wt % HCl and 19 wt % $MgCl_2$ salt, a second comparative acid composition was an HCl emulsified system, and a third comparative acid composition was a solution of 15 wt % HCl and 2 vol % nonionic surfactant. Acid treatment compositions according to embodiments of the present disclosure that were tested included a first acid treatment composition having 15 wt % HCl, 2 vol % nonionic surfactant, and 11 wt % of $MgCl_2$ salt, and a second acid treatment composition having 15 wt % HCl, 2 vol % nonionic surfactant, and 19 wt % of $MgCl_2$ salt, where nonylphenol ethoxylate was used for the nonionic surfactants in the tested first and second acid treatment compositions.

TABLE 1

| Acid Treatment Composition | Relative Reaction Time |
|---|---|
| 15 wt % HCl neat | 1.0 |
| 15 wt % HCl + 19 wt % $MgCl_2$ | 5.6 |
| 15 wt % HCl emulsified | 6.8 |
| 15 wt % HCl + 2 vol % nonionic surfactant | 16.6 |
| 15 wt % HCl + 2 vol % nonionic surfactant + 11 wt % $MgCl_2$ | 23.6 |
| 15 wt % HCl + 2 vol % nonionic surfactant + 19 wt % $MgCl_2$ | 26.0 |

The experimental results shown in Table 1 indicate a reduction in reaction rate for acid treatment compositions according to embodiments of the present disclosure comprising an acid, a nonionic surfactant, and an inorganic retarding agent (salt). As shown, the first comparative sample comprising 19 wt % $MgCl_2$ salt with 15 wt % HCl acid required 5.6 times longer to dissolve the same percentage of a carbonate disc, as compared with the control sample of 15 wt % HCl neat solution. The emulsified 15 wt % HCl acid composition in the second comparative sample required 6.8 times longer to dissolve the same percentage of a carbonate disc, as compared with the control sample of the 15 wt % HCl neat solution. The third comparative sample having 2 vol % nonionic surfactant with 15 wt % HCl acid required 16.6 times longer to dissolve the same percentage of a carbonate disc, as compared with the control sample of 15 wt % HCl neat solution. The acid treatment composition according to embodiments of the present disclosure having 11 wt % $MgCl_2$ salt and 2 vol % nonionic surfactant with 15 wt % HCl required 23.6 times longer to dissolve the same percentage of a carbonate disc, as compared with the control sample of 15 wt % HCl neat solution. The greatest retardation shown in the experiment was with the acid treatment composition according to embodiments of the present disclosure having 19 wt % MgCl$_2$ salt and 2 vol % nonionic surfactant with 15 wt % HCl acid, which required 26 times longer to dissolve the same percentage of a carbonate disc, as compared with the control sample of 15 wt % HCl neat solution.

Figure 2:
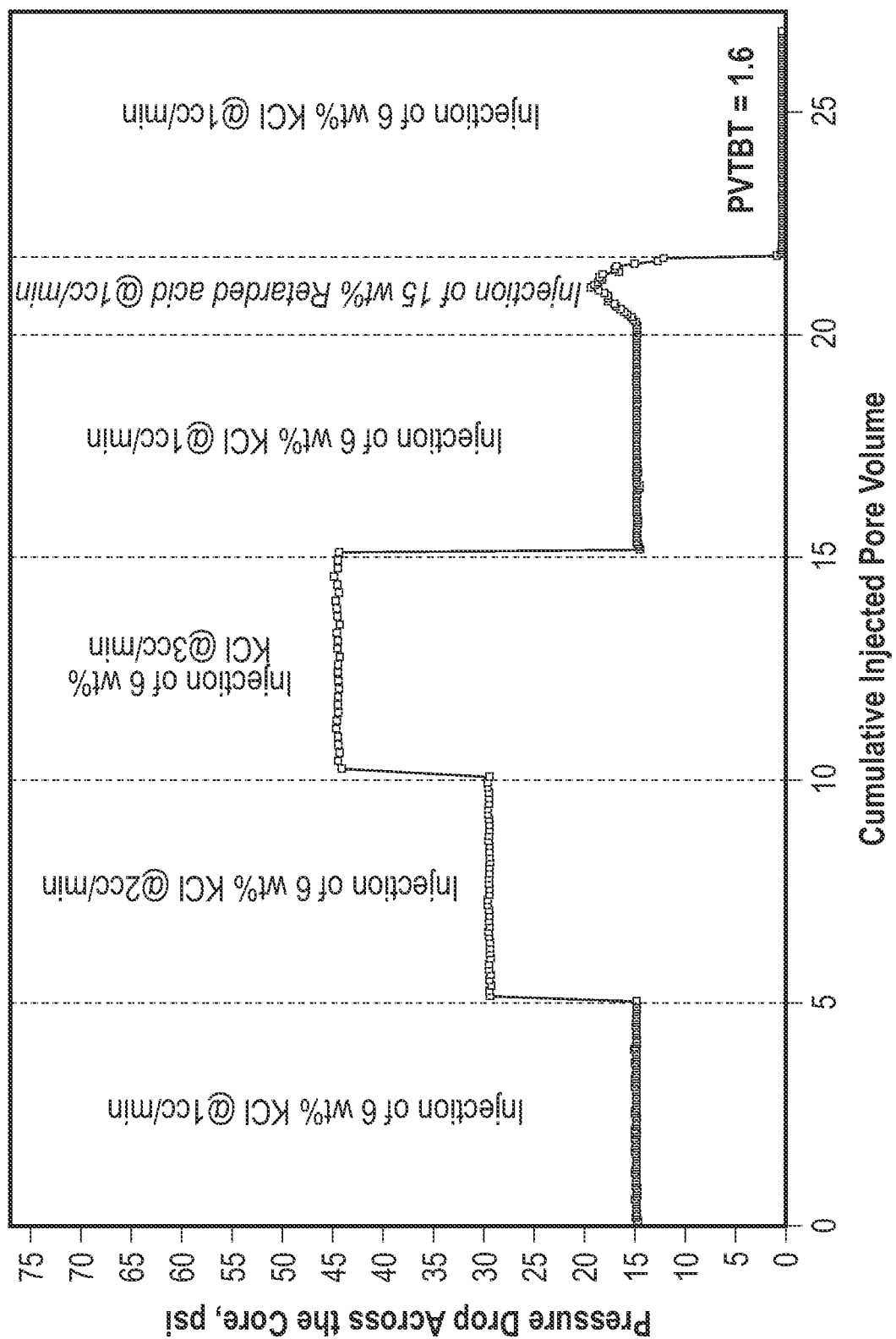
FIGS. 2 and 3 show graphs of results for core-flooding tests comparing the pore volume of a core sample to the breakthrough of two acid treatments.
Figure 3:
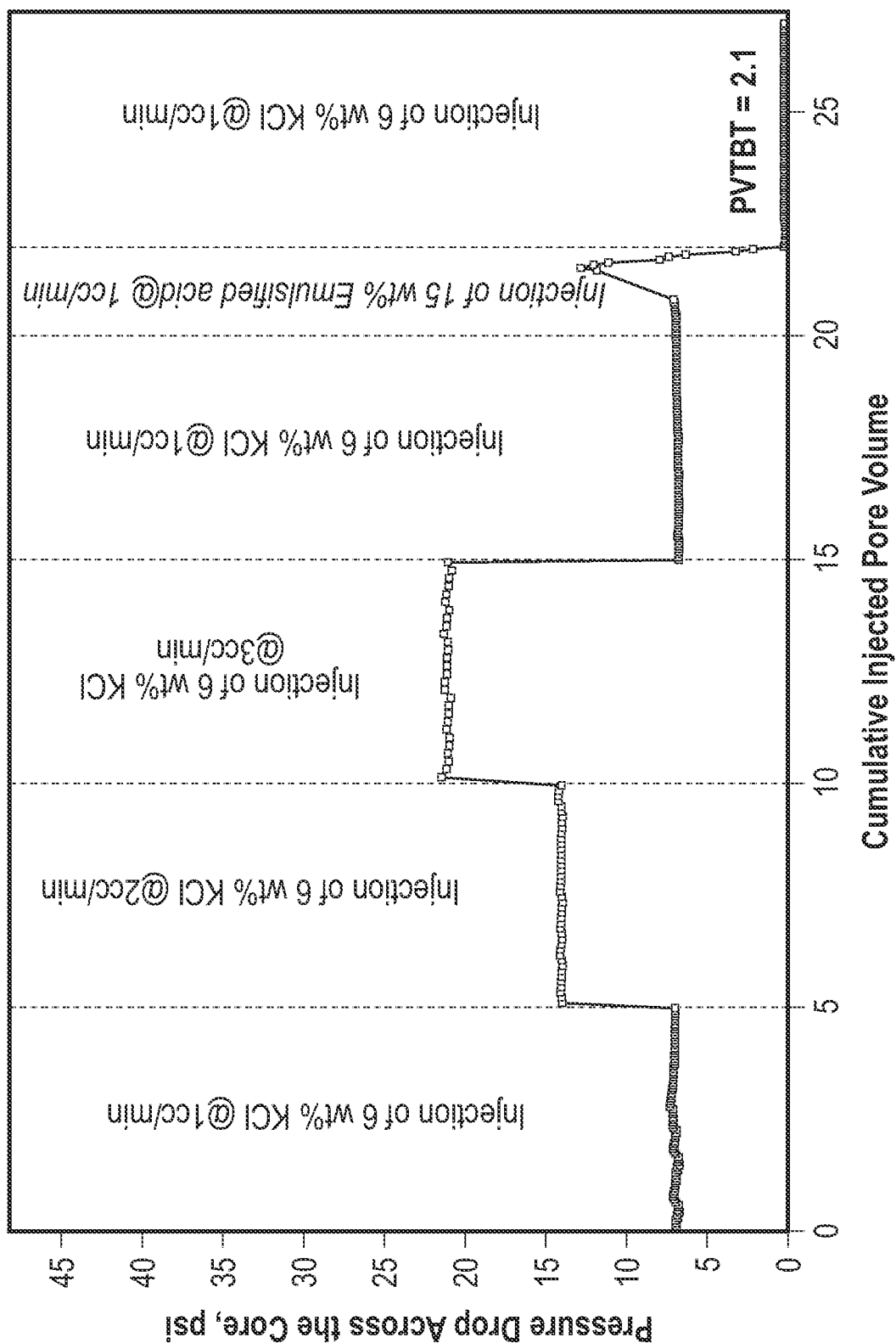

Additionally, core-flooding tests were conducted to measure resulting rock properties from treatment with different acid compositions. FIGS. 2 and 3 show graphs of the results for the core-flooding tests comparing the pore volume of two core samples to the breakthrough of two retarded acid treatments. In the core-flooding testing, the cores were initially saturated with 6 wt. % of KCl brine to established baseline conditions by measuring the flowrate and the differential pressure across the core inlet and outlet. In the testing conducted for FIG. 2, the core sample was further injected with an acid treatment composition according to embodiments of the present disclosure. In the testing conducted for FIG. 3, the core sample was further injected with a conventional emulsified acid mixture. As shown, the breakthrough pore volume total ($PVT_{BT}$) when treating the core sample with the acid treatment composition according to embodiments of the present disclosure ($PVT_{BT}$=1.6) was 24% less than when the core sample was treated with the conventional emulsified acid mixture ($PVT_{BT}$=2.1), thereby indicating that lesser amounts of treating fluid is needed when treating a formation with the acid treatment composition according to embodiments of the present disclosure to reach breakthrough.

Conventionally, several strategies have been employed for retarding the reaction rate between an acid and carbonate formations. For example, acids have been encapsulated or emulsified to have a polymer-type shell or coating, provided in an acid-in-diesel (a water-in-oil) emulsion, foamed, or provided in gelled systems. When acid is encapsulated or emulsified, stimuli changes (e.g., changes in temperature, pressure, pH, or shear flow) may be used to trigger the release of the acid. Alternative conventional strategies have included the use of organic acids or retarding agents in different combinations. However, limitations on conventionally used acid mixtures exist, such as the high friction pressures resulting from emulsified acid treatment compositions, the poor emulsion stability at elevated temperatures associated with emulsified acids, the incompatibility of amphoteric/anionic/cationic retarder surfactants with other acidizing additives and crude oil, formation damage associated with polymeric gelled acid treatment compositions, and formation damage associated with precipitation of salts from the use of high-concentration of organic acids.

Embodiments of the present disclosure may provide improved acid reactivity control as compared to conventional delayed acid treatment compositions, such as emulsified acid treatment compositions. For example, embodiments of the present disclosure may maintain a consistent level of dissolving power generated by a strong (mineral) acid, such as HCl, with no compatibility issues with other required acid additives. Further, by using acid treatment compositions disclosed herein, detrimental reaction byproducts may not be generated during reaction with the formation. Additionally, embodiments of the present disclosure may provide aqueous acid treatment compositions that require lower friction pressures, thus alleviating the high friction pressures associated with the use of emulsified acid treatment compositions. For example, aqueous acid treatment compositions may have the same associated friction pressure as with the water base fluid.

According to embodiments of the present disclosure, acid treatment compositions disclosed herein may allow acid treatments to formations to be conducted at higher rates, when compared to conventional acidizing systems. Additionally, using acid treatment compositions according to embodiments of the present disclosure may alleviate the formation damage that typically occurs when using (polymeric) gelled acid treatment compositions.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An acid treatment composition, comprising:
   a nonionic surfactant comprising nonyl phenol ethoxylate, wherein the nonyl phenol ethoxylate has a hydrophilic portion formed of O—(CH$_2$CH$_2$O)$_n$H, where n has an average of 6;
   a retarding agent comprising magnesium, wherein the retarding agent is present at a concentration of from about 20% to 30% by weight;
   an acid; and
   water;
   wherein the nonionic surfactant and retarding agent are reactive with carbonate.

2. The acid treatment composition of claim 1, wherein the nonionic surfactant is present at a concentration of from about 0.5% to 2.0% by weight.

3. The acid treatment composition of claim 1, wherein the acid is present at a concentration of from about 0.5% to 20% by weight.

4. The acid treatment composition of claim 1, wherein the nonionic surfactant is organic.

5. The acid treatment composition of claim 1, wherein the acid comprises hydrochloric acid, nitric acid, phosphoric acid, sulfuric acid, hydrofluoric acid, hydrobromic acid, perchloric acid, or fluoroboric acid.

6. The acid treatment composition of claim 1, wherein the acid is hydrochloric acid and the retarding agent is a magnesium salt.

7. The acid treatment composition of claim 1, wherein the retarding agent comprises magnesium chloride or magnesium chloride hexahydrate salt.

8. The acid treatment composition of claim 1, wherein the retarding agent is inorganic.

9. The acid treatment composition of claim 1, wherein the acid treatment composition has a viscosity of greater than 0 and less than 10 centipoise (cP) at temperatures from 80° F. to 300° F.

10. The acid treatment composition of claim 1 further comprising one or more additives selected from the group consisting of pH-adjusting agents, pH-buffers, oxidizing agents, enzymes, lost circulation materials, scale inhibitors, emulsifiers, clay stabilizers, corrosion inhibitors, paraffin inhibitors, asphaltene inhibitors, penetrating agents, clay control additives, iron control additives, friction reducers, oxygen scavengers, sulfide scavengers, foamers, bactericides, and combinations thereof.

11. An acid treatment composition, comprising:
    a nonionic surfactant comprising nonyl phenol ethoxylate, wherein the nonyl phenol ethoxylate has a hydrophilic portion formed of O—(CH$_2$CH$_2$O)$_n$H, where n has an average of 6, and wherein the nonionic surfactant is 0.5% to 2.0% by weight composition of the acid treatment composition;

a retarding agent, wherein the retarding agent is 20% to 30% by weight composition of the acid treatment composition, and wherein the retarding agent is a salt; and an acid, wherein the acid is 0.5% to 20% by weight composition of the acid treatment composition;

wherein the remaining composition of the acid treatment composition comprises an inert solvent.

12. The acid treatment composition of claim 11, wherein the retarding agent comprises magnesium.

13. The acid treatment composition of claim 11, wherein the acid is hydrochloric acid, the retarding agent is a magnesium salt.

14. The acid treatment composition of claim 11, wherein the retarding agent comprises magnesium chloride or magnesium chloride hexahydrate salt.

15. The acid treatment composition of claim 11, further comprising one or more additives selected from the group consisting of pH-adjusting agents, pH-buffers, oxidizing agents, enzymes, lost circulation materials, scale inhibitors, emulsifiers, clay stabilizers, corrosion inhibitors, paraffin inhibitors, asphaltene inhibitors, penetrating agents, clay control additives, iron control additives, friction reducers, oxygen scavengers, sulfide scavengers, foamers, bactericides, and combinations thereof.

16. A method of reducing the reactivity of an acid treatment composition, comprising:

contacting a formation in a wellbore with the acid treatment composition, wherein the acid treatment composition consists of:

a nonionic surfactant, wherein the nonionic surfactant is 0.5% to 2.0% by weight composition of the acid treatment composition and comprises nonyl phenol ethoxylate, wherein the nonyl phenol ethoxylate has a hydrophilic portion formed of $O-(CH_2CH_2O)_nH$, where n has an average of 6;

a retarding agent, wherein the retarding agent is 20% to 30% by weight composition of the acid treatment composition and comprises magnesium; and an acid, wherein the acid is 0.5% to 20% by weight composition of the acid treatment composition;

wherein the remaining composition of the acid treatment composition comprises water; and allowing the acid treatment composition to contact with the formation for between 0.5 and 12 hours.

17. The method of claim 16, further comprising:

combining the nonionic surfactant, the retarding agent, and the acid prior to introducing the acid treatment composition into the wellbore.

18. The method of claim 16, wherein the wellbore has a temperature of at least 80° F. where the acid treatment composition contacts the formation.

* * * * *